United States Patent
Kajiyama

(10) Patent No.: US 11,463,600 B2
(45) Date of Patent: Oct. 4, 2022

(54) INFORMATION PROCESSING APPARATUS THAT ACQUIRES SETTING INFORMATION AND ADDS IDENTIFICATION INFORMATION TO THE SETTING INFORMATION TO GENERATE EDITING DATA

(71) Applicant: FUJIFILM Business Innovation Corp., Tokyo (JP)

(72) Inventor: Hajime Kajiyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/246,791

(22) Filed: May 3, 2021

(65) Prior Publication Data

US 2022/0191334 A1 Jun. 16, 2022

(30) Foreign Application Priority Data

Dec. 16, 2020 (JP) .............................. JP2020-208361

(51) Int. Cl.
*H04N 1/44* (2006.01)
*H04N 1/00* (2006.01)

(52) U.S. Cl.
CPC ....... *H04N 1/0097* (2013.01); *H04N 1/00973* (2013.01); *H04N 1/4433* (2013.01); *H04N 1/4413* (2013.01); *H04N 2201/0094* (2013.01)

(58) Field of Classification Search
None
See application file for complete search history.

(56) References Cited

U.S. PATENT DOCUMENTS

| 9,535,640 | B2 * | 1/2017 | Iwasaki | H04L 63/08 |
| 2013/0250330 | A1 * | 9/2013 | Chigusa | H04N 1/00973 358/1.14 |
| 2015/0339561 | A1 * | 11/2015 | Takenaka | G06F 1/00 358/1.14 |
| 2016/0286061 | A1 * | 9/2016 | Saka | H04N 1/00411 |
| 2017/0171415 | A1 | 6/2017 | Kubokura | |
| 2017/0244866 | A1 * | 8/2017 | Kano | G06F 3/1222 |
| 2018/0103160 | A1 * | 4/2018 | Sugita | H04N 1/00925 |

FOREIGN PATENT DOCUMENTS

JP 6627477 B2 1/2020

* cited by examiner

*Primary Examiner* — Haris Sabah
(74) *Attorney, Agent, or Firm* — Oliff PLC

(57) ABSTRACT

An information processing apparatus includes a processor configured to: acquire setting information corresponding to first identification information input from a user from among plural pieces of setting information for controlling an operation of a device, the plural pieces of setting information being stored in an external server device; add the first identification information to the acquired setting information to generate editing data; and if (i) second identification information input from the user when receiving an instruction to update content of the setting information using the editing data and (ii) the first identification information added to the editing data based on which the content of the setting information is to be updated match, update the content of the setting information based on the editing data.

9 Claims, 22 Drawing Sheets

FIG. 6

EXAMPLE OF STORED SETTING DATA

| SETTING DATA NAME | USER ID | ORDER NUMBER |
|---|---|---|
| PERIODIC BACKUP IN OCTOBER, 2020<br>MODEL NAME : ABCD111 | A1234456 | 016442624 |
| MODEL REPLACEMENT TRANSFER DATA<br>○○○ CORPORATION | A1234456 | 03895647 |
| BACKUP DATA ON SEPTEMBER 11, 2020<br>XXX TRADING CO., LTD. | A1234456 | 069932581 |
| PERIODIC BACKUP ON AUGUST 10, 2020<br>ABC CORPORATION | A1234457 | 03214567 |
| TEMPORARY BACKUP ON NOVEMBER 25, 2020<br>AAAA CORPORATION | A1234460 | 04516258 |

EXAMPLE OF DISPLAY SCREEN FOR USER TO LOG IN TO SETTING MANAGEMENT SERVICE OF MANAGEMENT SERVER 20

EXAMPLE OF DISPLAY SCREEN FOR USER TO INPUT ORDER NUMBER

FIG. 10

EXAMPLE OF LIST OF SETTING DATA

DEVICE SETTING EDITING TOOL

SETTING MANAGEMENT SERVICE

ORDER NUMBER : 01642624

LIST OF BACKUP DATA

| SETTING DATA NAME | NOTES |
|---|---|
| PERIODIC BACKUP IN OCTOBER, 2020<br>MODEL NAME: ABCD111 | DATE: 2020/10/26  16:23<br>SERIAL NUMBER:123456<br>OPERATION LOCATION: DEVICE<br>OPERATION TYPE BACKUP |
| PERIODIC BACKUP IN NOVEMBER, 2020<br>MODEL NAME: ABCD222 | DATE: 2020/11/20  19:01<br>SERIAL NUMBER:333444<br>OPERATION LOCATION: DEVICE<br>OPERATION TYPE BACKUP |
| PERIODIC BACKUP IN NOVEMBER, 2020<br>MODEL NAME: ABCD333 | DATE: 2020/11/08  09:11<br>SERIAL NUMBER:456789<br>OPERATION LOCATION: DEVICE<br>OPERATION TYPE BACKUP |

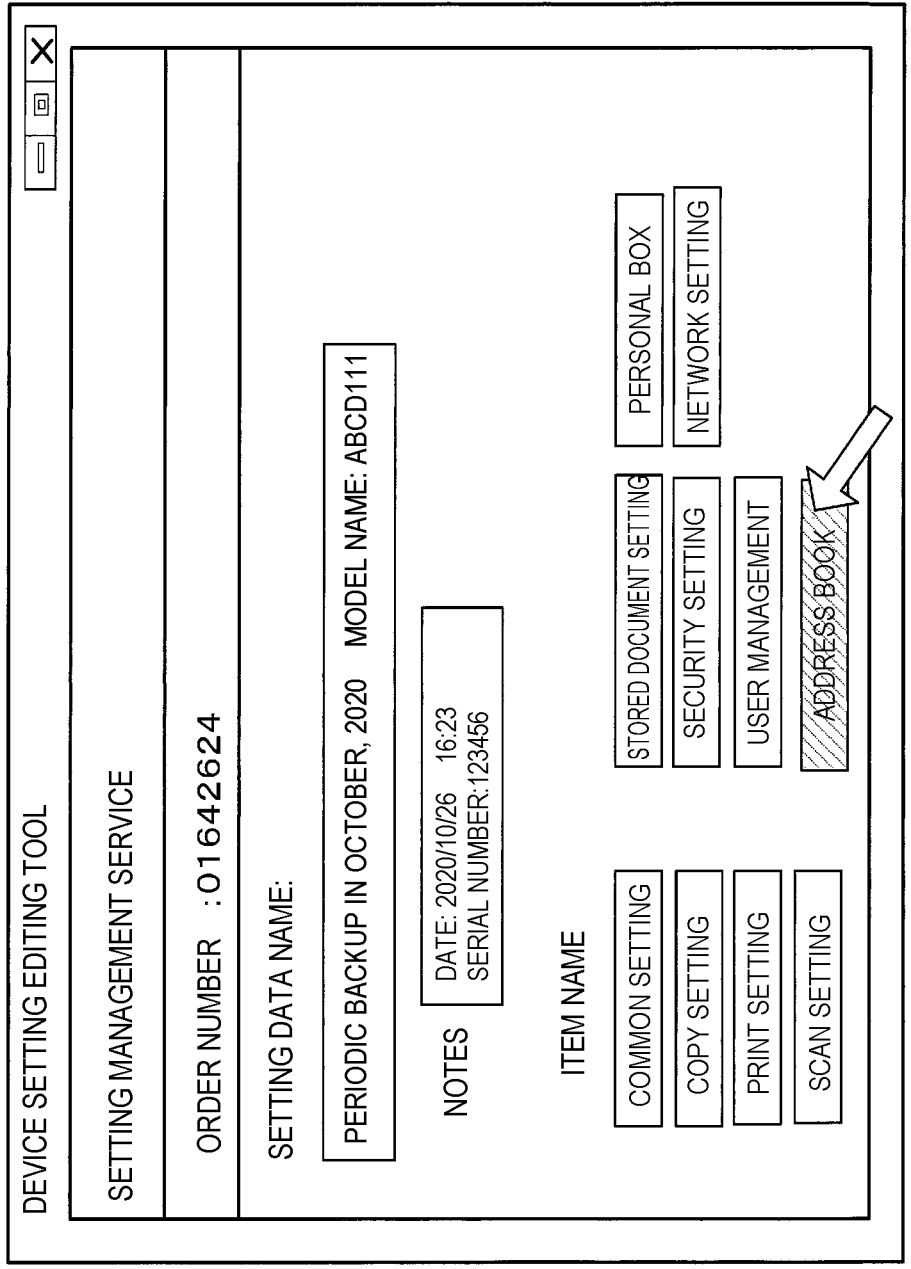

FIG. 12

EXAMPLE OF DISPLAYING ADDRESS BOOK DATA

DEVICE SETTING EDITING TOOL

SETTING MANAGEMENT SERVICE

ORDER NUMBER : 01642624

SETTING DATA NAME:
PERIODIC BACKUP IN OCTOBER, 2020 MODEL NAME: ABCD111 : ADDRESS BOOK

| ADDRESS NAME | CONTACT DETAILS |
|---|---|
| AAA CORPORATION | 03-1111-2222 |
| BBB CORPORATION | 045-123-4567 |
| CCC CORPORATION | 03-3333-4444 |
| ABC CORPORATION | 03-4567-8888 |
| DEF CORPORATION | 045-789-7890 |

[ADD CONTACT DETAILS]　[ADD GROUP]　[DELETE CONTACT DETAILS/GROUP]　[OTHER OPERATION]

FIG. 13

EXAMPLE OF EXPORT OPERATION OF ADDRESS BOOK DATA

DEVICE SETTING EDITING TOOL

SETTING MANAGEMENT SERVICE

ORDER NUMBER: 01642624

SETTING DATA NAME:
PERIODIC BACKUP IN OCTOBER, 2020 MODEL NAME: ABCD111 : ADDRESS BOOK

| DESTINATION NAME | CONTACT DETAILS |
|---|---|
| AAA CORPORATION | 03-1111-2222 |
| BBB CORPORATION | 045-123-4567 |
| CCC CORPORATION | 03-3333-4444 |
| ABC CORPORATION | 03-4567-8888 |
| DEF CORPORATION | 045-789-7890 |

IMPORT ADDRESS BOOK
EXPORT ADDRESS BOOK

OTHER OPERATION

ADD CONTACT DETAILS

ADD GROUP

DELETE CONTACT DETAILS/ GROUP

FIG. 15

EXAMPLE OF EXPORTED ADDRESS BOOK FILE

| A | B | C | D |
|---|---|---|---|
| ORDER NUMBER | 01642624 | | |
| SETTING DATA NAME | PERIODIC BACKUP IN OCTOBER, 2020<br>MODEL NAME: ABCD111 | | |
| DETAILED INFORMATION | DATE: 2020/10/26　16:23<br>SERIAL NUMBER:123456<br>OPERATION LOCATION: DEVICE<br>OPERATION TYPE BACKUP | | |
| ADDRESS NAME | AAA CORPORATION | 03-1111-2222 | |
| | BBB CORPORATION | 045-123-4567 | |
| | CCC CORPORATION | 03-3333-4444 | |
| | ABC CORPORATION | 03-4567-8888 | |
| | DEF CORPORATION | 045-789-7890 | |

FIG. 16

EXAMPLE OF IMPORT OPERATION OF ADDRESS BOOK DATA

DEVICE SETTING EDITING TOOL

SETTING MANAGEMENT SERVICE

ORDER NUMBER : 01642624

SETTING DATA NAME:
PERIODIC BACKUP IN OCTOBER, 2020 MODEL NAME: ABCD111 : ADDRESS BOOK

IMPORT/ADDRESS BOOK
EXPORT ADDRESS BOOK
OTHER OPERATION

| ADDRESS NAME | CONTACT DETAILS |
|---|---|
| AAA CORPORATION | 03-1111-2222 |
| BBB CORPORATION | 045-123-4567 |
| CCC CORPORATION | 03-3333-4444 |
| ABC CORPORATION | 03-4567-8888 |
| DEF CORPORATION | 045-789-7890 |

ADD CONTACT DETAILS   ADD GROUP   DELETE CONTACT DETAILS/GROUP

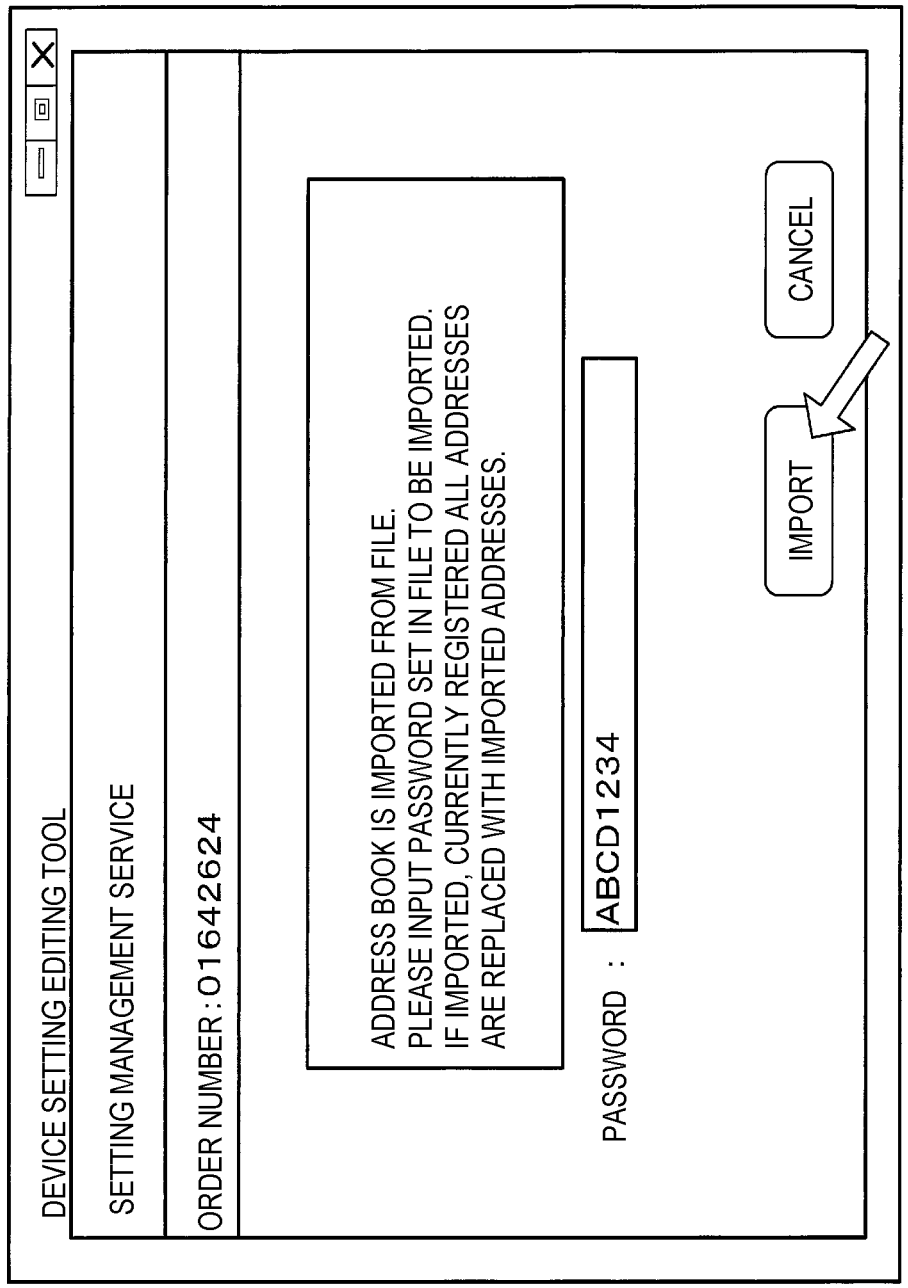

EXPORT/IMPORT PROCESS OF ADDRESS BOOK FILE
(WHEN ORDER NUMBER IS USED)

EXAMPLE OF ERROR DISPLAY SCREEN
WHEN USER IS TRYING TO IMPORT INCORRECT ADDRESS BOOK FILE

EXAMPLE OF SCREEN SHOWING COMPLETION OF IMPORT OF ADDRESS BOOK FILE

INFORMATION PROCESSING APPARATUS THAT ACQUIRES SETTING INFORMATION AND ADDS IDENTIFICATION INFORMATION TO THE SETTING INFORMATION TO GENERATE EDITING DATA

CROSS-REFERENCE TO RELATED APPLICATIONS

This application is based on and claims priority under 35 USC 119 from Japanese Patent Application No. 2020-208361 filed Dec. 16, 2020.

BACKGROUND (i) Technical Field

The present disclosure relates to an information processing apparatus and a non-transitory computer readable medium.

(ii) Related Art

JP-B-6627477 describes an information processing system in which an external device acquires setting information that controls the operation of a device, generates change information by changing the acquired setting information, and sets the generated change information in the device.

SUMMARY

Aspects of non-limiting embodiments of the present disclosure relate to an information processing apparatus and a non-transitory computer readable medium capable of preventing the content of setting information from being updated based on incorrect data when acquiring and editing setting information stored in an external server device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire setting information corresponding to first identification information input from a user from among plural pieces of setting information for controlling an operation of a device, the plural pieces of setting information being stored in an external server device; add the first identification information to the acquired setting information to generate editing data; and if (i) second identification information input from the user when receiving an instruction to update content of the setting information using the editing data and (ii) the first identification information added to the editing data based on which the content of the setting information is to be updated match, update the content of the setting information based on the editing data.

BRIEF DESCRIPTION OF THE DRAWINGS

Exemplary embodiment(s) of the present disclosure will be described in detail based on the following figures, wherein:

FIG. 6 is a diagram illustrating a state in which the setting data associated with a user account and an order number is stored in the management server 20;

FIG. 10 is a diagram illustrating a state in which a list of setting data acquired from the management server 20 is displayed on a display 22 of the terminal device 10;

FIG. 11 is a diagram illustrating an example of an operation screen when designating address book information in the selected setting data;

FIG. 12 is a diagram illustrating an example of details of the data content of the address book displayed when the user designates the information of the address book on the operation screen as illustrated in FIG. 11;

FIG. 13 is a diagram illustrating an example of an operation screen when the user selects to export the address book;

FIG. 15 is a diagram illustrating an example of an address book file generated as an editing file;

FIG. 16 is a diagram illustrating an example of an operation screen when receiving an instruction to import an edited file from a user;

FIG. 17 is a diagram illustrating an example of an operation screen for requesting the user to input a password when an address book file to be imported is selected;

DETAILED DESCRIPTION

Next, an exemplary embodiment of the present disclosure will be described in detail with reference to the drawings.

Figure 1:
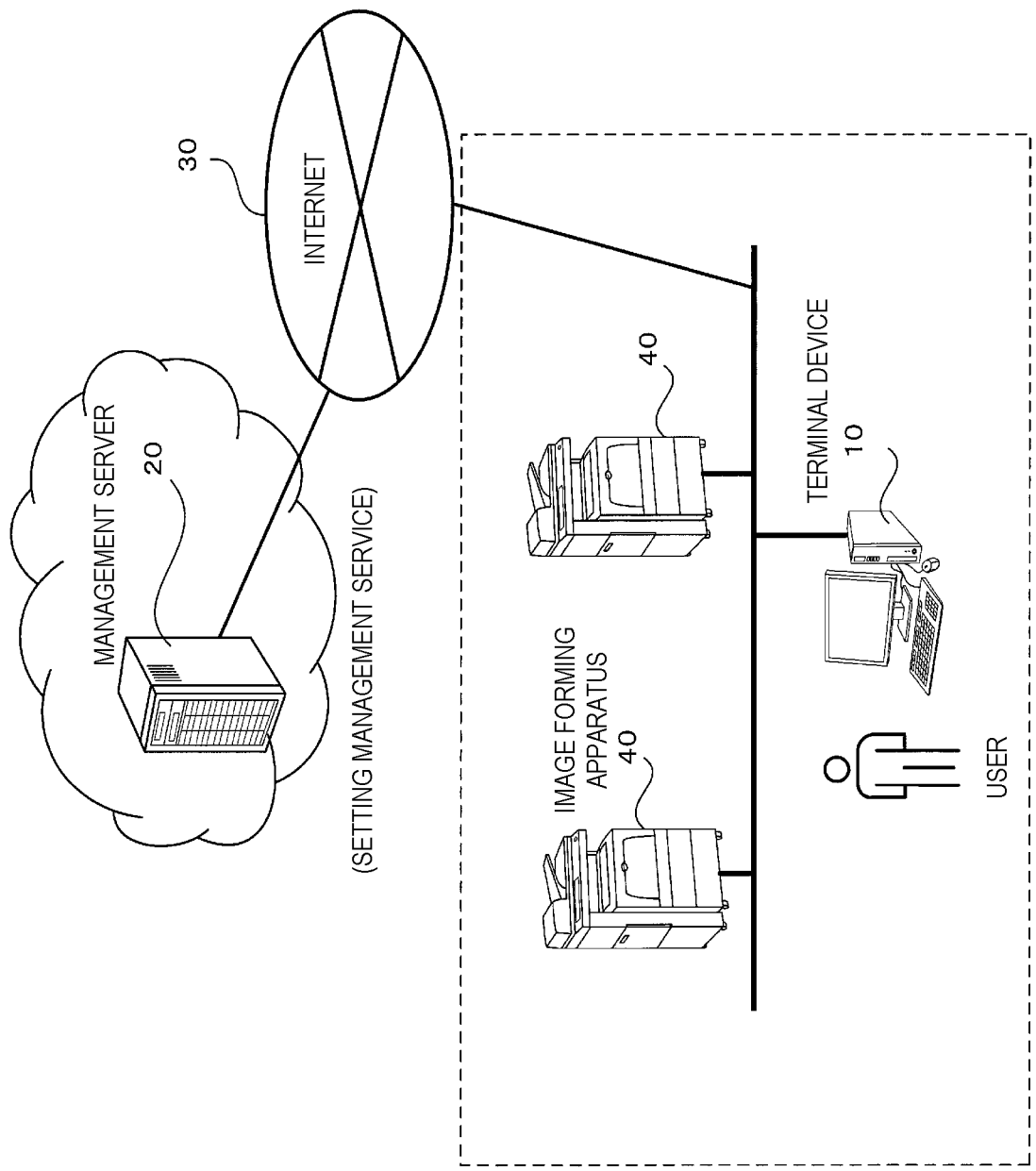
FIG. 1 is a diagram illustrating a system configuration of an information processing system according to an exemplary embodiment of the present disclosure.

FIG. 1 is a diagram illustrating a system configuration of an information processing system according to an exemplary embodiment of the present disclosure.

As illustrated in FIG. 1, the information processing system of the exemplary embodiment of the present disclosure is configured such that an image forming apparatus 40 and a terminal device 10 are connected by an in-house network, and the terminal device 10 and the image forming apparatus 40 are further connected to a management server 20 via the Internet 30.

The image forming apparatus 40 is a so-called multifunction device having plural functions such as a printing function, a scanning function, a copying function, and a facsimile function. Further, the terminal device 10 is an information processing apparatus such as a personal computer.

The management server 20 is an information processing apparatus that provides a setting management service such as storing setting data as backup data as a so-called cloud service and restoring the stored setting data in response to a request. Specifically, the management server 20 receives the setting data uploaded from the image forming apparatus 40 and stores the received setting data as backup data.

In this way, the management server 20 stores the setting information of the image forming apparatus 40 as backup data, so that the original setting content may be restored when the setting data is accidentally deleted in any of the devices, the same setting content as before may be maintained in the replaced device when the device is replaced, or the same setting content as an already introduced device may be set in a newly introduced device.

Here, the setting data is setting information for controlling the operation of the image forming apparatus 40. The setting data includes various information, for example, various setting items such as a scan resolution when performing a scanning process and a color mode when performing a copy process, setting values for each setting item, and address list information used when transmitting a fax.

Figure 2:
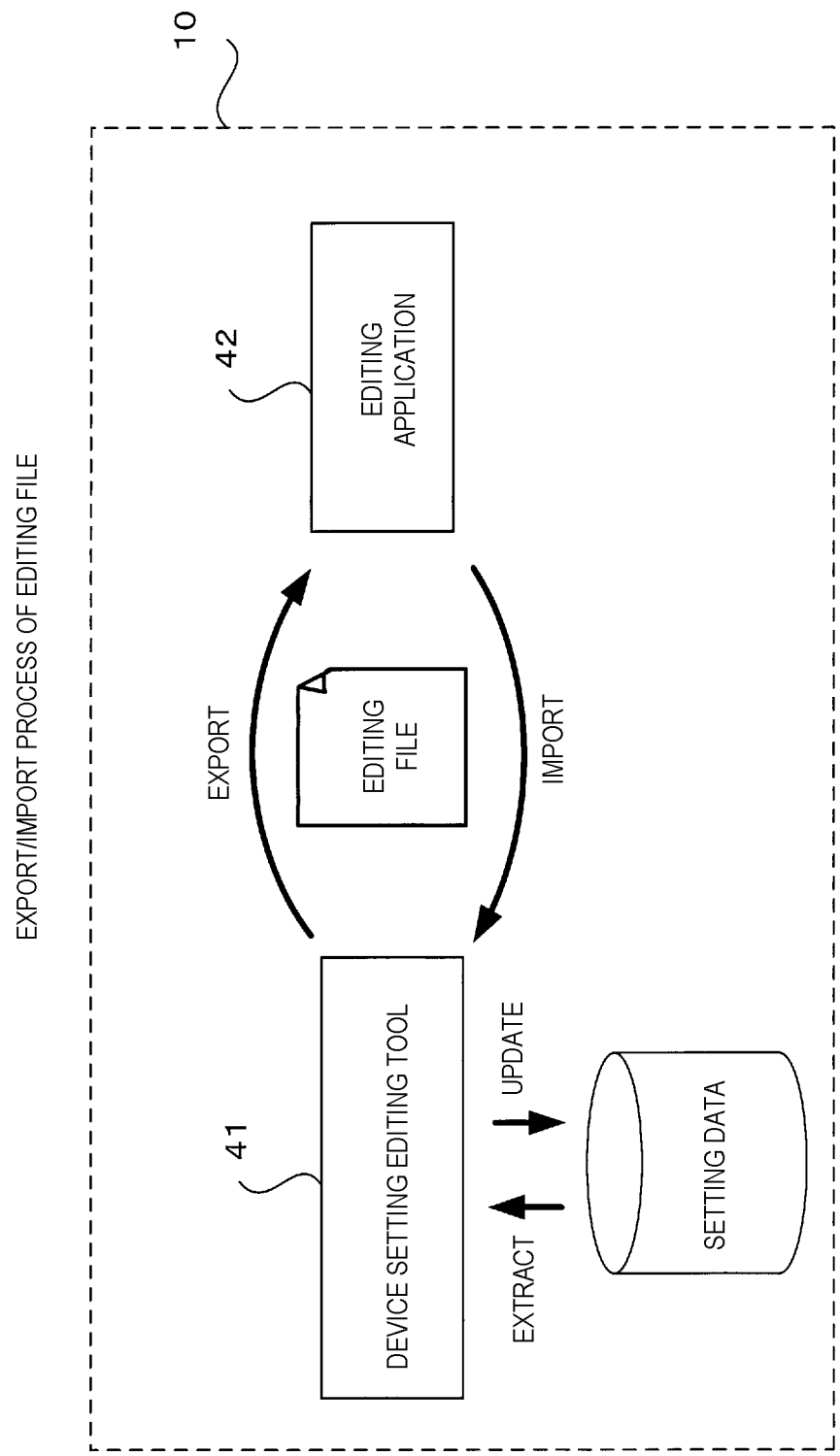
FIG. 2 is a diagram illustrating an export/import process of an editing file.

Then, as illustrated in FIG. 2, the terminal device 10 is installed with software called a device setting editing tool 41 for acquiring and editing the setting data stored in the management server 20, and an editing application (the abbreviation of an application program) 42 for editing the editing file data generated by the device setting editing tool 41. The terminal device 10 acquires and edits the setting data of the image forming apparatus 40 stored in the management server 20 by the device setting editing tool, and the image forming apparatus 40 acquires the setting data and transmits the data to the management server 20, or sets the setting data acquired from the management server 20 in the image forming apparatus 40.

Meanwhile, it is also possible to directly transmit the setting data from the image forming apparatus 40 to the management server 20 or to acquire the setting data from the management server 20.

Here, the device setting editing tool 41 generates the editing file data when editing the setting data acquired from the management server 20. The device setting editing tool 41 exports the data to be edited from the setting data as file data in a general-purpose format such as, for example, Excel (registered trademark), which is spreadsheet software of Microsoft Corporation in the United States. Then, the content of the editing file data is edited by the editing application 42, and the edited file data (editing file data which has been edited) is imported by the device setting editing tool 41, and the content of the setting data is updated.

FIG. 2 represents a case where the device setting editing tool 41 extracts only the address information such as the address book from the setting data and exports the information as an address book file. However, the entire setting data may be exported as editing file data without extracting only a part of the setting data.

Here, operations such as a backing up and editing process of the setting data of the image forming apparatus 40 are often performed by the machine administrator of a customer user in which the image forming apparatus 40 is installed. However, there may be a large number of installed image forming apparatuses or the machine administrator may be unfamiliar with the operation. Therefore, an operation such as a backing up and editing process may be executed by a customer engineer (hereinafter, abbreviated as CE) who is a maintenance person of the manufacturer of the image forming apparatus 40. Hereinafter, the user will be referred to as a user including such a machine administrator and CE.

Here, the CE may perform setting operation for image forming apparatus of various companies. Then, the CE may use his/her own laptop computer to go to the installation place of the image forming apparatus of the customer user to perform various setting operations. In such a case, when the address book file extracted from the setting data of the image forming apparatus of a company A is mistakenly imported into the setting data of the image forming apparatus of a company B and the setting content are updated, the information in the address book of the company A is leaked to the company B.

Therefore, in the terminal device 10 of the present exemplary embodiment, by performing the following processing, it is possible to prevent the content of the setting data from being updated based on the incorrect data when acquiring and editing the setting data stored in the external server device.

Figure 3:
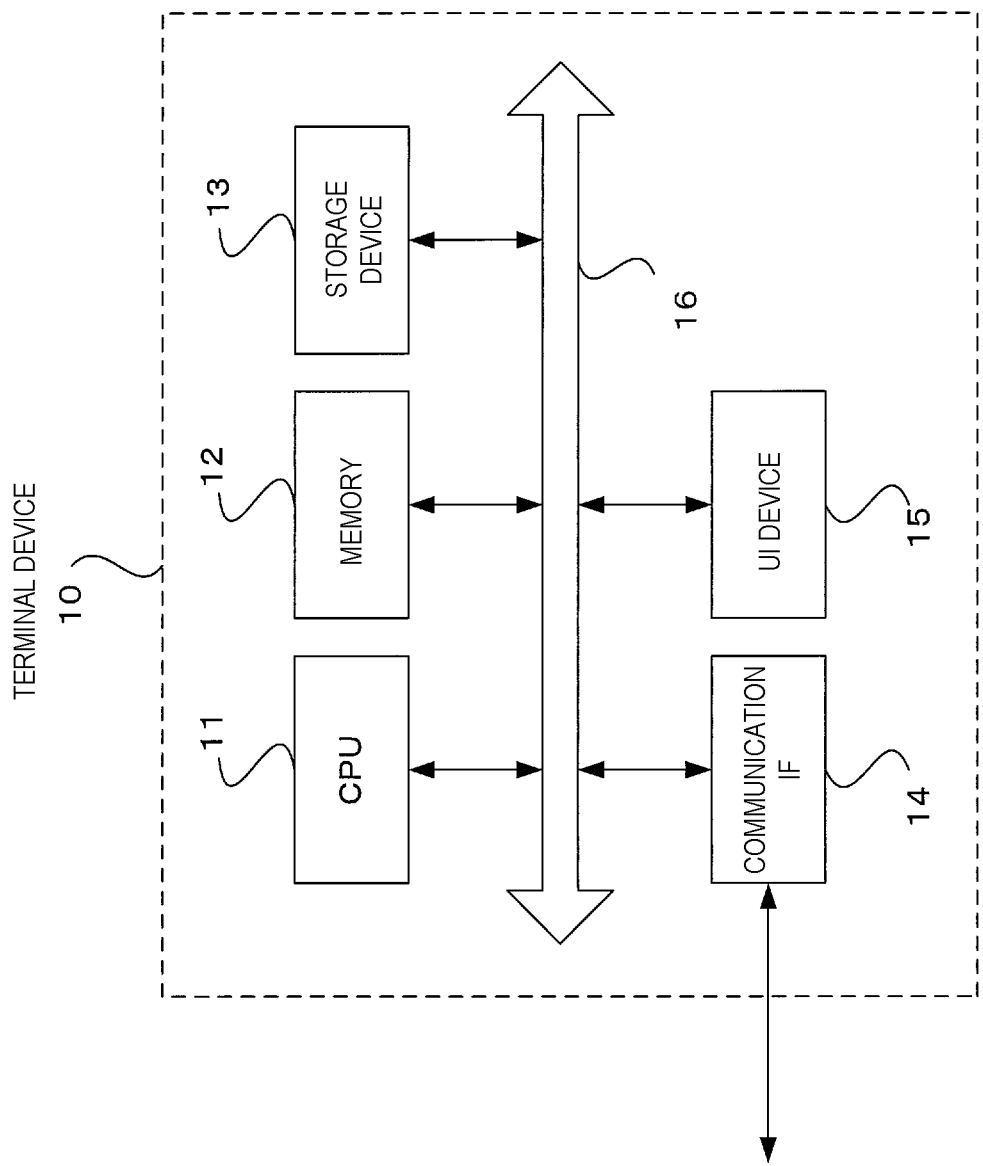
FIG. 3 is a block diagram illustrating a hardware configuration of a terminal device 10 according to the exemplary embodiment of the present disclosure.

Next, FIG. 3 represents the hardware configuration of the terminal device 10 in the information processing system of the present exemplary embodiment.

As illustrated in FIG. 3, the terminal device 10 includes a CPU 11, a memory 12, a storage device 13 such as a hard disk drive, a communication interface (abbreviated as IF) 14 that transmits and receives data to and from an external device via the Internet 30, and a user interface (abbreviated as UI) device 15 including a touch panel or a liquid crystal display and a keyboard. These elements are connected to each other via a control bus 16.

The CPU 11 executes a predetermined process based on the control program stored in the memory 12 or the storage device 13 to control the operation of the terminal device 10. In the present exemplary embodiment, the CPU 11 will be described as reading and executing the control program stored in the memory 12 or the storage device 13, but it is also possible to store the program in a storage medium such as a CD-ROM and provide the program to the CPU 11.

Figure 4:
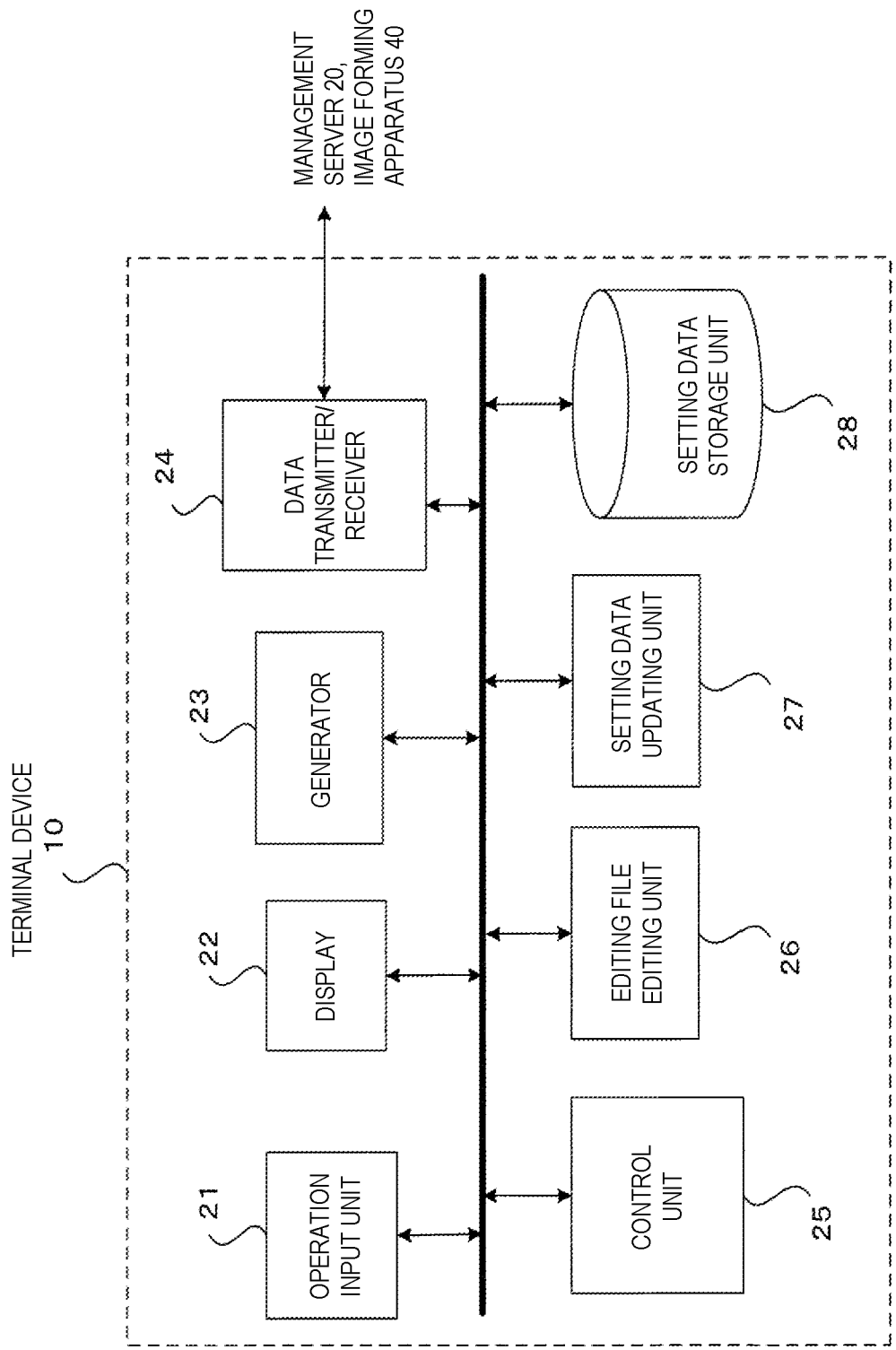
FIG. 4 is a block diagram illustrating a functional configuration of the terminal device 10 according to the exemplary embodiment of the present disclosure.

FIG. 4 is a block diagram illustrating a functional configuration of the terminal device 10 implemented by executing the above control program.

As illustrated in FIG. 4, the terminal device 10 of the present exemplary embodiment includes an operation input unit 21, a display 22, a generator 23, a data transmitter/ receiver 24, a controller 25, an editing unit 26, a setting data updating unit 27, and a setting data storage unit 28.

The data transmitter/receiver 24 transmits/receives data to/from an external device such as the management server 20 and the image forming apparatus 40.

The controller 25 controls the entire operation of the terminal device 10. The display 22 is controlled by the controller 25 and displays various information to the user. The operation input unit 21 inputs various types of operation information performed by the user.

In the present exemplary embodiment, in order to use the setting data management service provided by the management server 20, a user account such as a user ID is set for a user such as a machine administrator or CE. Then, an order number, which is identification information, is newly issued on the management server 20 for each of various operations such as an editing operation of setting data and an operation of transferring setting data managed by the management server 20. This order number may be any number as long as it does not overlap with other order numbers issued in the past.

For example, when the user stores the setting data set in the image forming apparatus 40 in the management server 20 and then performs the editing operation, the management server 20 first issues a new order number. Then, the user logs in using its own user account, inputs the order number issued by the management server 20, and instructs the transmission of the setting data to the management server 20. Then, the image forming apparatus 40 transmits the setting data of the own apparatus to the management server 20 together with the user account of the logged-in user and the input order number. Then, the management server 20 stores the transmitted setting data in association with the user account and the order number.

Then, when the user logs in using his/her own user account in the terminal device 10 and inputs the order number, the controller 25 acquires the setting data corresponding to the order number input by the user from among the plural pieces of setting data stored in the management server 20, which is an external server device, via the data transmitter/receiver 24. Then, the acquired setting data is stored in the setting data storage unit 28.

The generator 23 adds an order number to the setting data acquired and stored in the setting data storage unit 28 to generate and export editing file data (hereinafter, simply abbreviated as an editing file). The generator 23 may not generate the entire setting data stored in the setting data storage unit 28 as an editing file, but may extract only a part of the setting data and generate the part thereof as an editing file. For example, the generator 23 may extract only the address information from among the setting data to generate an address book file, or may extract only the information related to the print setting to generate the print setting file.

The editing unit 26 performs an editing process on the editing file generated by the generator 23 based on an operation from the user.

The setting data updating unit 27 imports the editing file after the editing process is performed, and updates the content of the setting data with the imported editing file. At that time, if (i) the order number input by the user when an instruction to import the editing file and update the content of the setting data is received and (ii) the order number added to the editing file based on which the content of the setting data is to be updated match, the setting data updating unit 27 updates the content of the setting data based on the editing file.

Meanwhile, if (i) the order number input by the user when the instruction to update the content of the setting data using the editing file is received and (ii) the order number added to the editing file based on which the content of the setting data to be updated do not match, the setting data updating unit 27 notifies the user of information to that effect, and does not update the content of the setting data based on the editing file.

The generator 23 may receive an input of authentication information such as a password in generating an editing file from the acquired setting data, and add the received authentication information to the editing file. In this case, upon receipt of the instruction to update the content of the setting data using the editing file, the setting data updating unit 27 requests the user to input the authentication information. If (i) the input authentication information and (ii) the authentication information added to the editing data based on which the content of the setting data is to be updated match, the setting data update unit 27 updates the content of the setting data based on the editing file.

Further, if (i) the input authentication information when the instruction to update the content of the setting data using the editing file is received and (ii) the authentication information added to the editing file based on which the content of the setting data is to be updated do not match, the setting data updating unit 27 does not update the content of the setting data based on the editing file.

Next, the operation of the terminal device 10 in the present exemplary embodiment will be described in detail with reference to the drawings.

Figure 5:
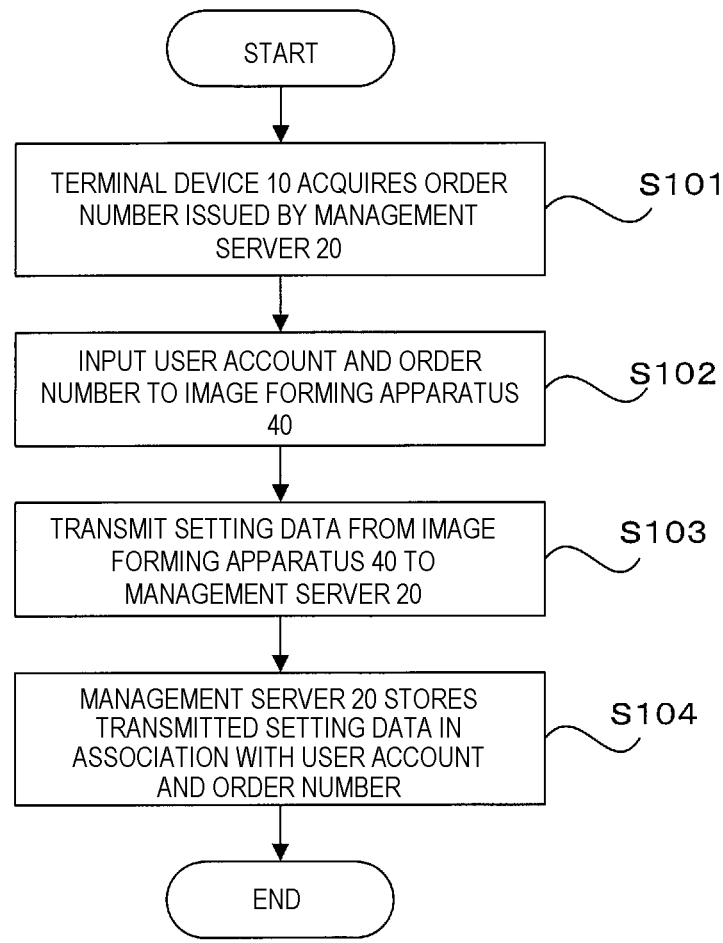
FIG. 5 is a flowchart of an operation when setting data is transmitted from an image forming apparatus 40 to a management server 20 and stored.

First, with reference to the flowchart of FIG. 5, descriptions will be made on the operation when the setting data is transmitted from the image forming apparatus 40 to the management server 20 and stored.

First, when the user operates the terminal device 10 to request the management server 20 to issue an order number, the terminal device 10 acquires the order number issued by the management server 20 in step S101.

Then, in step S102, the user who has acquired the order number moves to the location of the image forming apparatus 40 where he/she wants to store the setting data, and inputs his/her own user account and order number to the image forming apparatus 40.

Then, in step S103, the image forming apparatus 40 transmits the setting data based on the setting content set in the own apparatus to the management server 20 together with the user account and the input order number.

Then, in step S104, the management server 20 stores the transmitted setting data in association with the user account and the order number.

The state in which the setting data associated with the user account and the order number is stored in the management server 20 in this way will be described with reference to FIG. 6.

With reference to FIG. 6, it is represented that the setting data name, which is the name of the setting data, the user ID, which is the user account, and the order number are associated with each other and stored.

Since the order number is issued for each operation, when a single user performs plural operations, plural order numbers are issued for one user ID, and setting data is associated with each order number.

That is, different numbers are issued between the order number when a user performs an operation relating to a company A and the order number when the user performs an operation relating to a company B. That is, the order number is identification information for identifying an operation that is issued for each operation having different content and is performed by the user.

Figure 7:
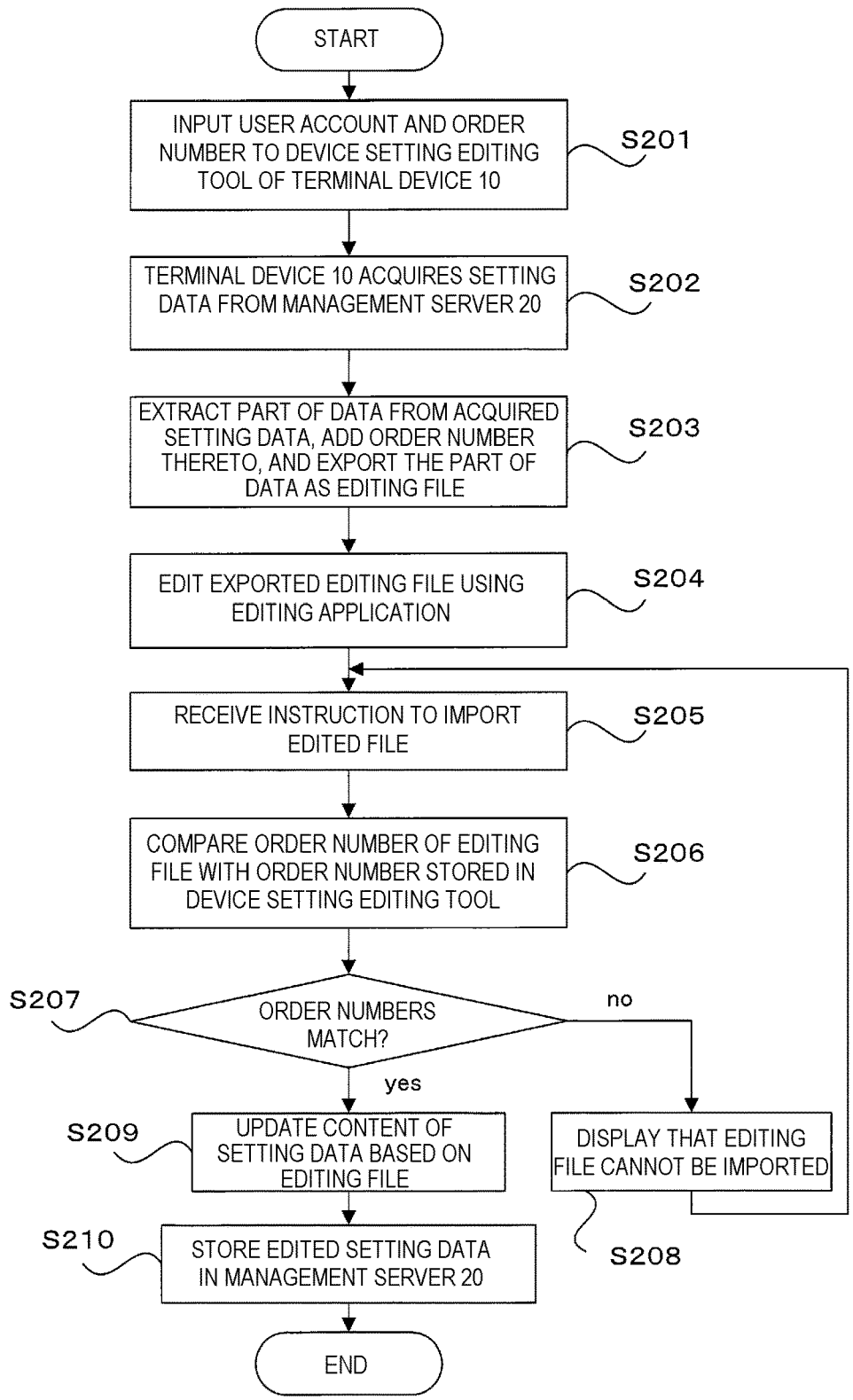
FIG. 7 is a flowchart of the operation when the terminal device 10 acquires the setting data managed by the management server 20 and performs editing operation.

Next, the operation when the terminal device 10 acquires the setting data managed by the management server 20 in this way and performs the editing operation will be described with reference to the flowchart of FIG. 7.

First, in step S201, the user who intends to perform the editing operation activates the device setting editing tool in the terminal device 10, and inputs the user account and the order number into the activated device setting editing tool.

Figure 8:
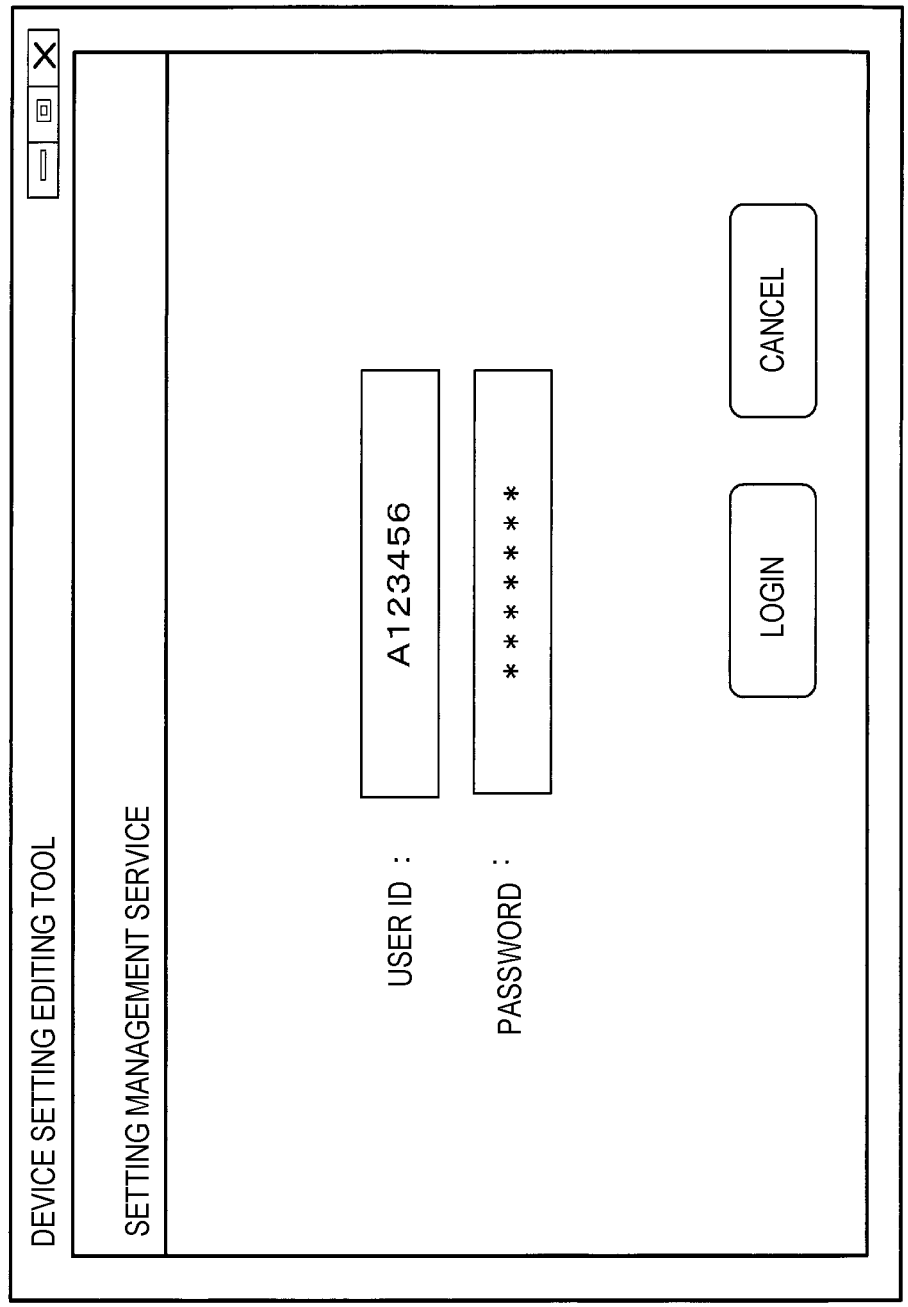
FIG. 8 is a diagram illustrating an example of a display screen of the terminal device 10 when a user logs in to the setting management service of the management server 20.
Figure 9:
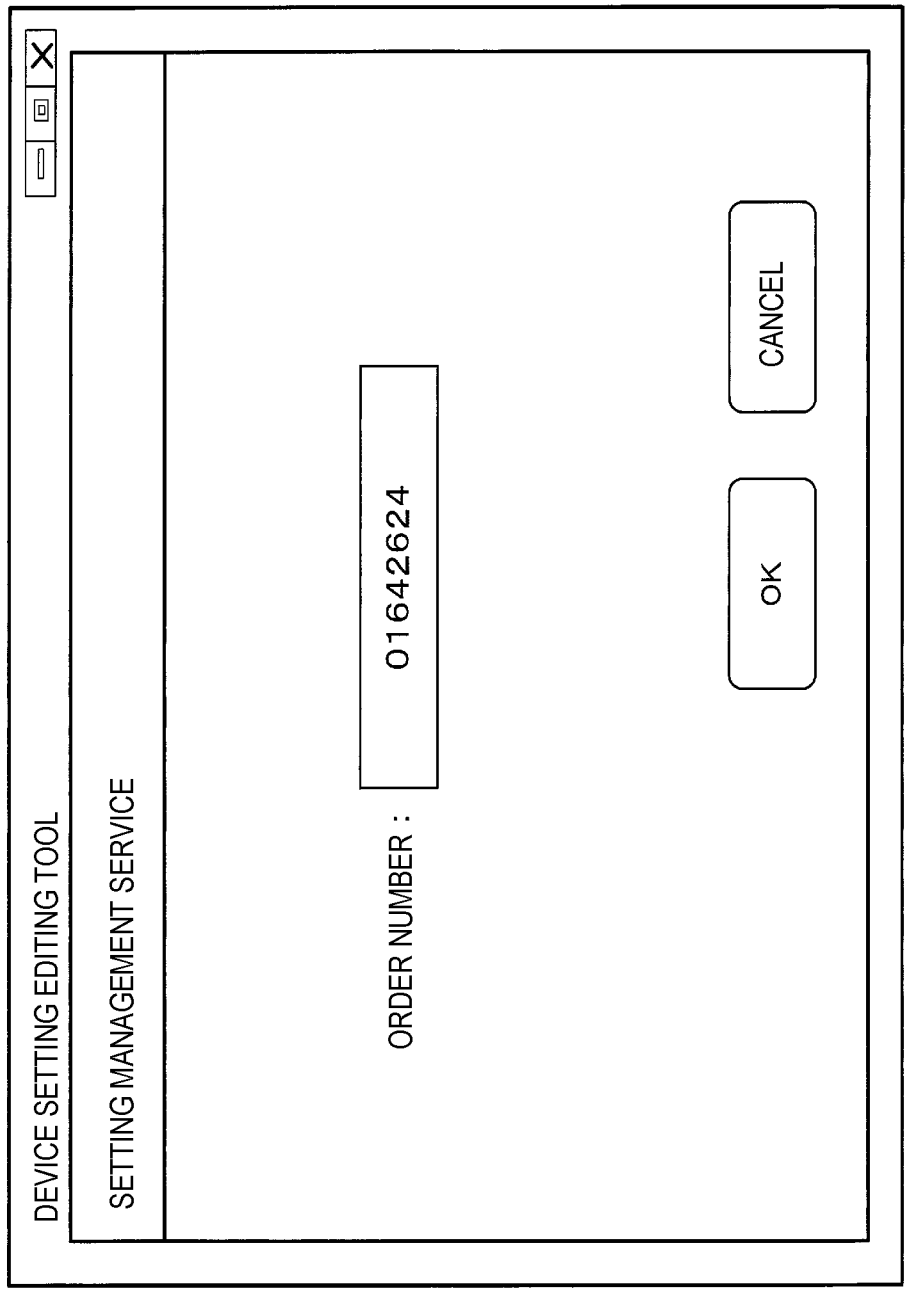
FIG. 9 is a diagram illustrating an example of a display screen when the user inputs an order number in the terminal device 10.

For example, FIG. 8 illustrates an example of a display screen of the terminal device 10 when a user logs in to the setting management service of the management server 20. Further, FIG. 9 illustrates an example of a display screen when the user inputs an order number in the terminal device 10.

FIG. 8 illustrates a state in which the user inputs the user ID "A123456" and the password to log in to the setting management service of the management server 20. Further, FIG. 9 illustrates a state in which the user inputs the order number "01642624" which the user acquired in advance and input when transmitting the setting data to the management server 20.

Meanwhile, the order number input in this way is stored as the order number of the operation being executed in the device setting editing tool of the terminal device 10 while the user is logging in.

Then, the device setting editing tool 41 of the terminal device 10 acquires the input order number and the setting data associated with the user account from the management server 20 in step S202.

FIG. 10 illustrates a state in which a list of the setting data acquired in this way is displayed on the display 22 of the terminal device 10. In the display screen example illustrated in FIG. 10, three pieces of setting data associated with the input order number are displayed. Here, FIG. 10 illustrates a state in which the setting data named "Periodic Backup in October, 2020, Model Name: ABCD111" is selected as the setting data to be edited by the user.

Next, in step S203, the terminal device 10 extracts a part of data from the setting data acquired by the generator 23, adds an order number thereto, and exports the part of data as an editing file.

For example, FIGS. 11 to 14 illustrates a state in which the user extracts only the address book information from the selected setting data and exports the extracted information as an editing file.

FIG. 11 is an example of an operation screen when designating the address book information in the selected setting data. When the user designates the address book information on the operation screen as illustrated in FIG. 11, the details of the data content of the address book are displayed as illustrated in, for example, FIG. 12.

Figure 14:
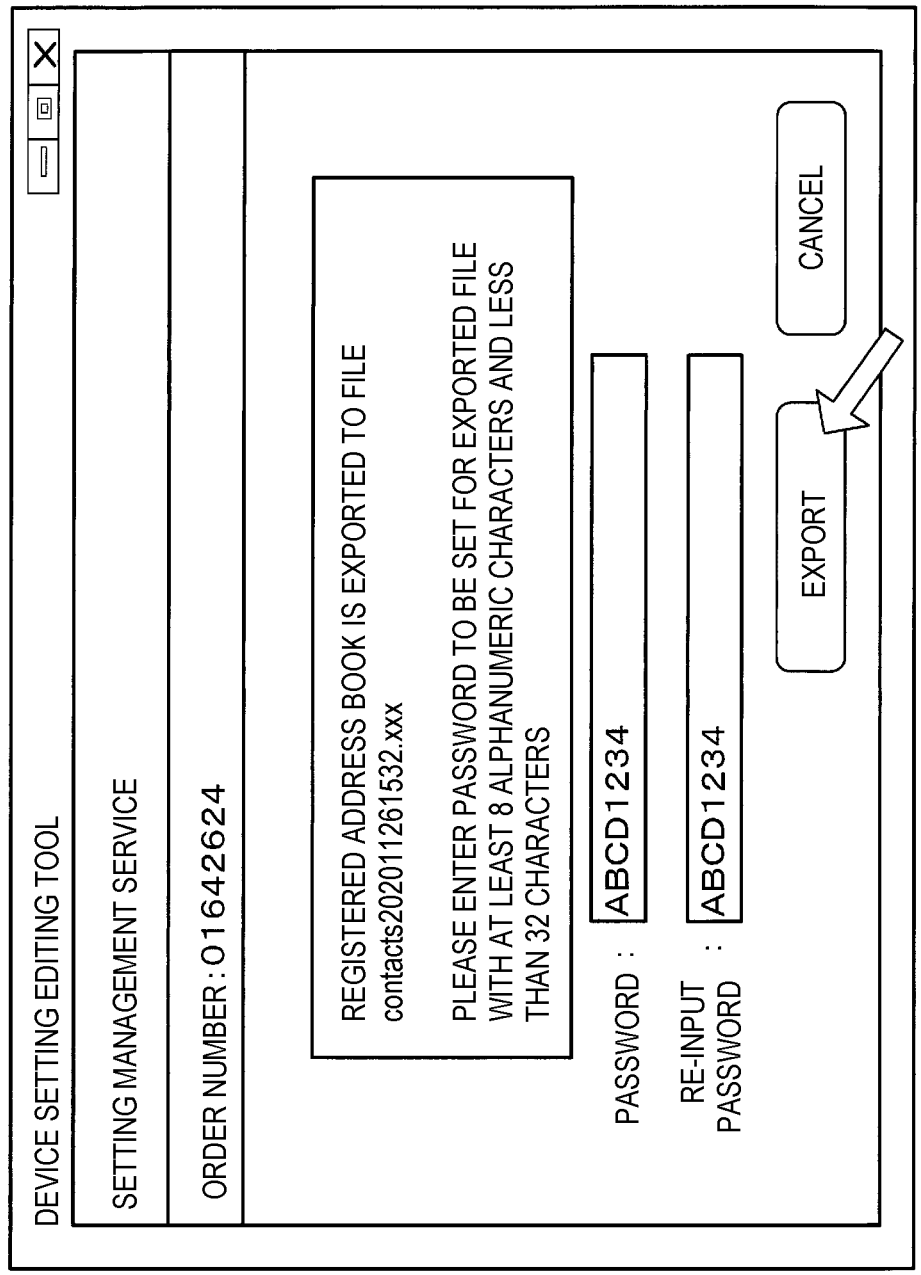
FIG. 14 is a diagram illustrating an example of an operation screen that is displayed when the user selects to export the address book and requires the user to input a password.

Then, when the user selects the export of the address book as in the operation screen example illustrated in FIG. 13, the screen is switched to the operation screen as illustrated in FIG. 14 and the user is requested to input the password.

Then, when the user inputs the password and selects the export button on the operation screen illustrated in FIG. 14, only the address book data is extracted as the editing file from the setting data. FIG. 15 illustrates an example of the address book file generated as the editing file in this way. With reference to FIG. 15, it may be seen that the order number "01642624" is added to the extracted address book file. This address book file is configured in the format of a general-purpose spreadsheet file, and the user may edit the content of the address book file by operating the editing application 42. At this time, the editing file may be extracted so as to prohibit the user from editing the order number to be changed or deleted. That is, the editing file is generated such that when the user edits the editing file, the user is permitted to view the order number added to the editing file, but is not permitted to edit the order number.

Next, the setting data updating unit 27 receives an instruction to import the editing file after the editing is performed by the editing application 42 in step S205. FIG. 16 illustrates an example of an operation screen when receiving an instruction to import an edited file from a user. FIG. 16 illustrates a state in which the user selects the item "import address book" and performs the import operation.

In the present exemplary embodiment, since the password is set in the exported address book file, after the address book file to be imported is selected, the operation screen as illustrated in FIG. 17 is displayed, and the user is requested to input the password.

Then, when the password input on the operation screen of FIG. 17 and the password set in the address book to be imported match, the setting data updating unit 27 starts the address book import process.

Figure 18:
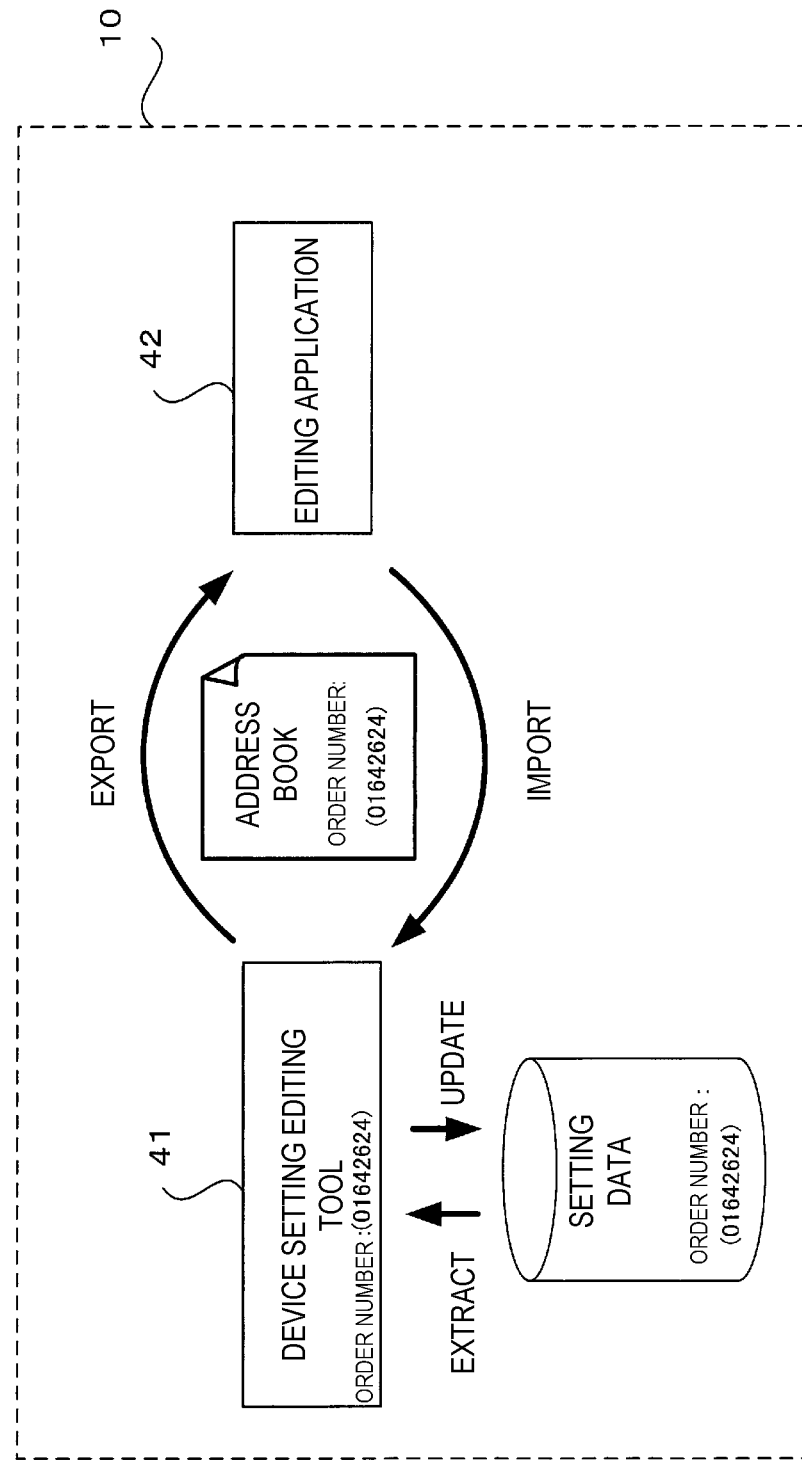
FIG. 18 is a diagram illustrating the export/import process of the editing file when the order number is used.

Here, in the present exemplary embodiment, as illustrated in FIG. 18, when the device setting editing tool 41 extracts an address book file from the setting data and exports the file as an address book file for editing, an order number is added to the address book file.

Then, the order number input when the user logs in is stored in the device setting editing tool 41.

Therefore, in step S206, when importing the address book file after the editing process is performed, the setting data updating unit 27 compares the order number input by the user with the order number added to the address book file to be imported.

Then, in step S207, the setting data updating unit 27 determines whether the two compared order numbers match.

When it is determined that the two order numbers compared in step S207 do not match, in step S208, the setting data updating unit 27 displays on, for example, the display 22 that the address book file, which is an editing file, may not be imported.

Figure 19:
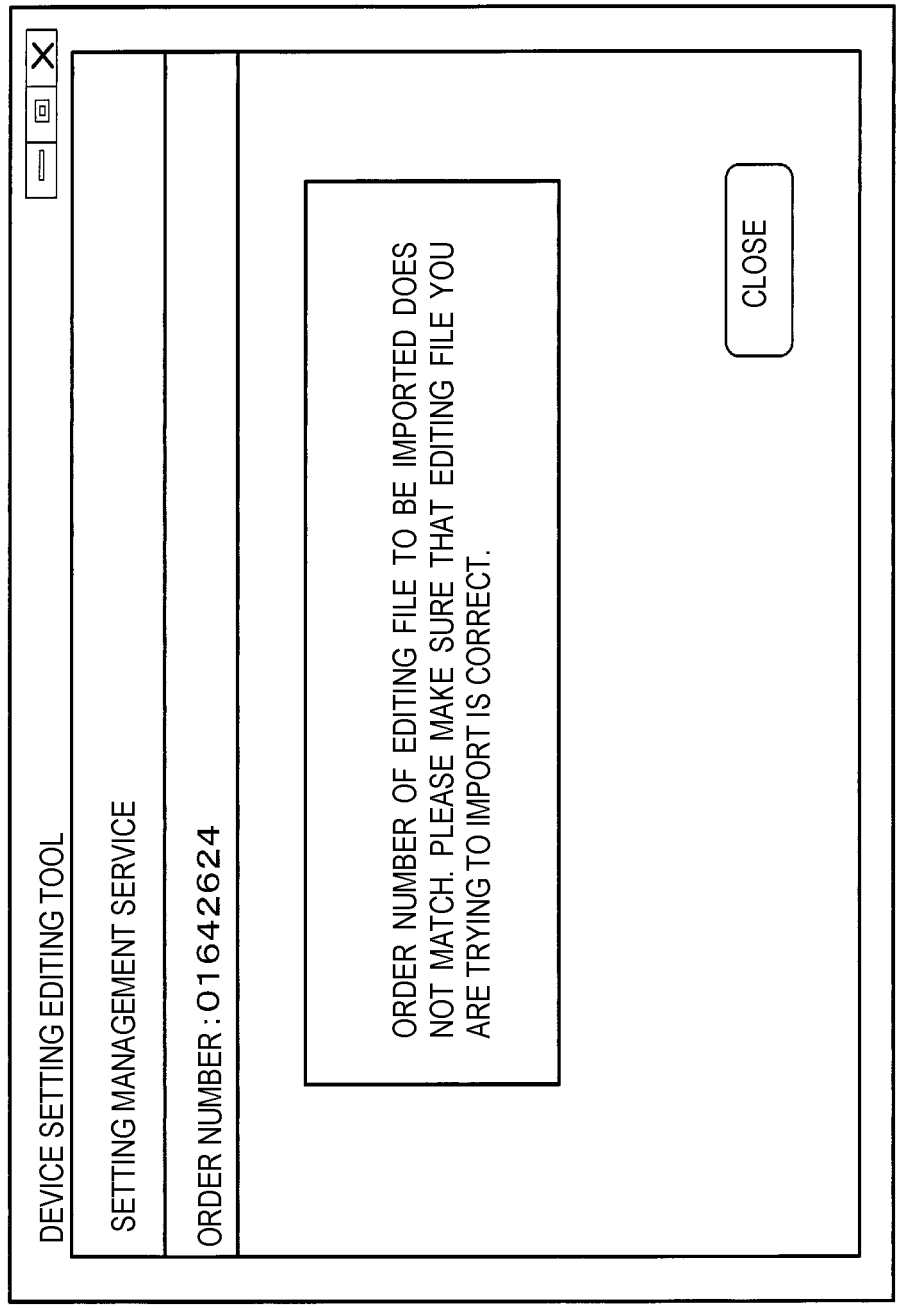
FIG. 19 is an example of a display screen when notifying the user that the address book file may not be imported.

An example of the display screen displayed in this way is illustrated in FIG. 19. With reference to FIG. 19, a text that "The order number of the editing file you are trying to import does not match. Please make sure that the editing file you are trying to import is correct." is displayed, and it may be seen that it is suggested that the editing file selected by the user during the import is incorrect.

Therefore, it is possible to prevent, for example, the occurrence of a situation in which the user mistakenly updates the address book data of the setting data of a company A by the address book file of a company B.

Figure 20:
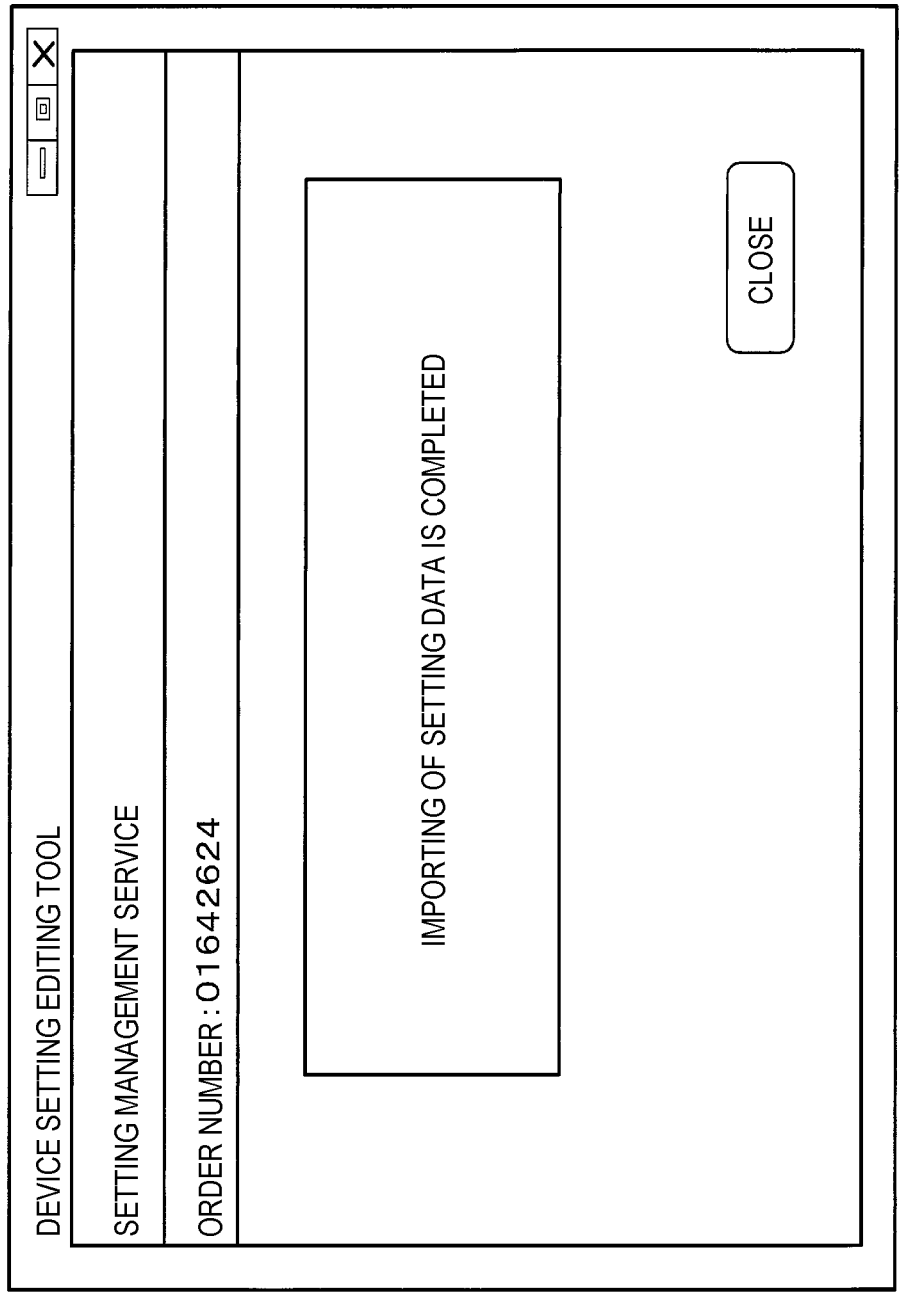
FIG. 20 is an example of a display screen when notifying the user that the import has been completed.

Further, when it is determined that the two order numbers compared in step S207 match, in step S209, the setting data updating unit 27 updates the content of the setting data based on the address book file which is an editing file. When the import may be executed normally in this way, a display screen as illustrated in FIG. 20 is displayed to notify the user that the import is completed.

Finally, when the user instructs to store the setting data in the management server 20, in step S210, the controller 25 transmits and stores the setting data after the content of the address book stored in the setting data storage unit 28 have been edited to the management server 20.

Figure 21:
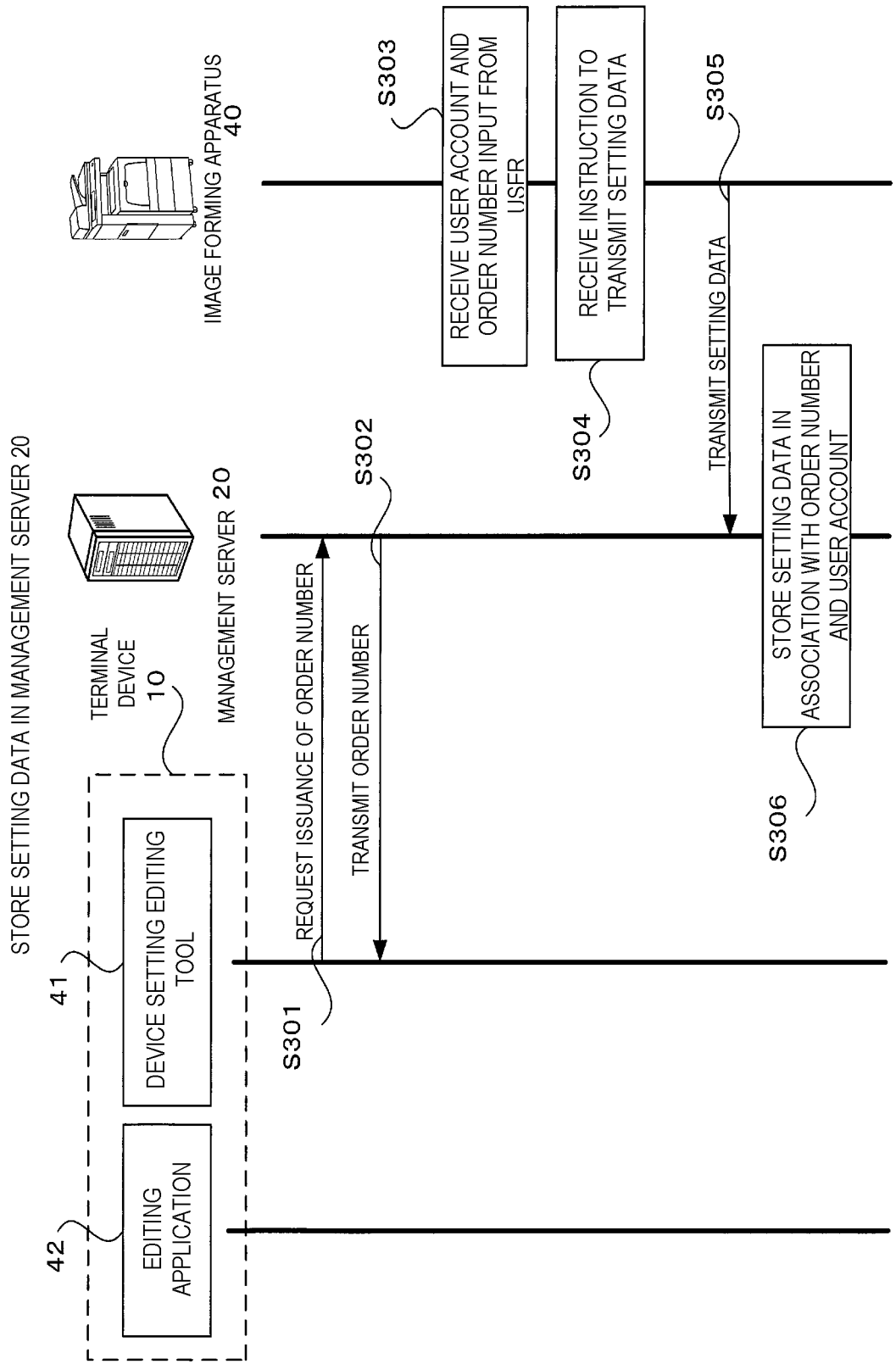
FIG. 21 is a sequence chart illustrating a state of data transmission/reception among the terminal device 10, the management server 20, and the image forming apparatus 40 in the process of storing the setting data in the management server 20.

Next, a sequence chart of FIG. 21 represents a state of data transmission/reception among the terminal device 10, the management server 20, and the image forming apparatus 40 in the process of storing the setting data described above in the management server 20.

First, the device setting editing tool 41 of the terminal device 10 requests the management server 20 to issue an order number in step S301. Then, in response to this issuance request, the management server 20 issues an order number and transmits the order number to the device setting editing tool 41 in step S302.

Next, the user who receives the order number issued in this way moves to the image forming apparatus 40 and inputs the user account and the order number to the image forming apparatus 40.

Then, the image forming apparatus 40 receives the user account and the order number input from the user in step S303, and further receives the transmission instruction of the setting data in step S304.

Then, the image forming apparatus 40 transmits the setting data to the management server 20 in step S305.

In step S306, the management server 20 stores the transmitted setting data in association with the order number and the user account.

Figure 22:
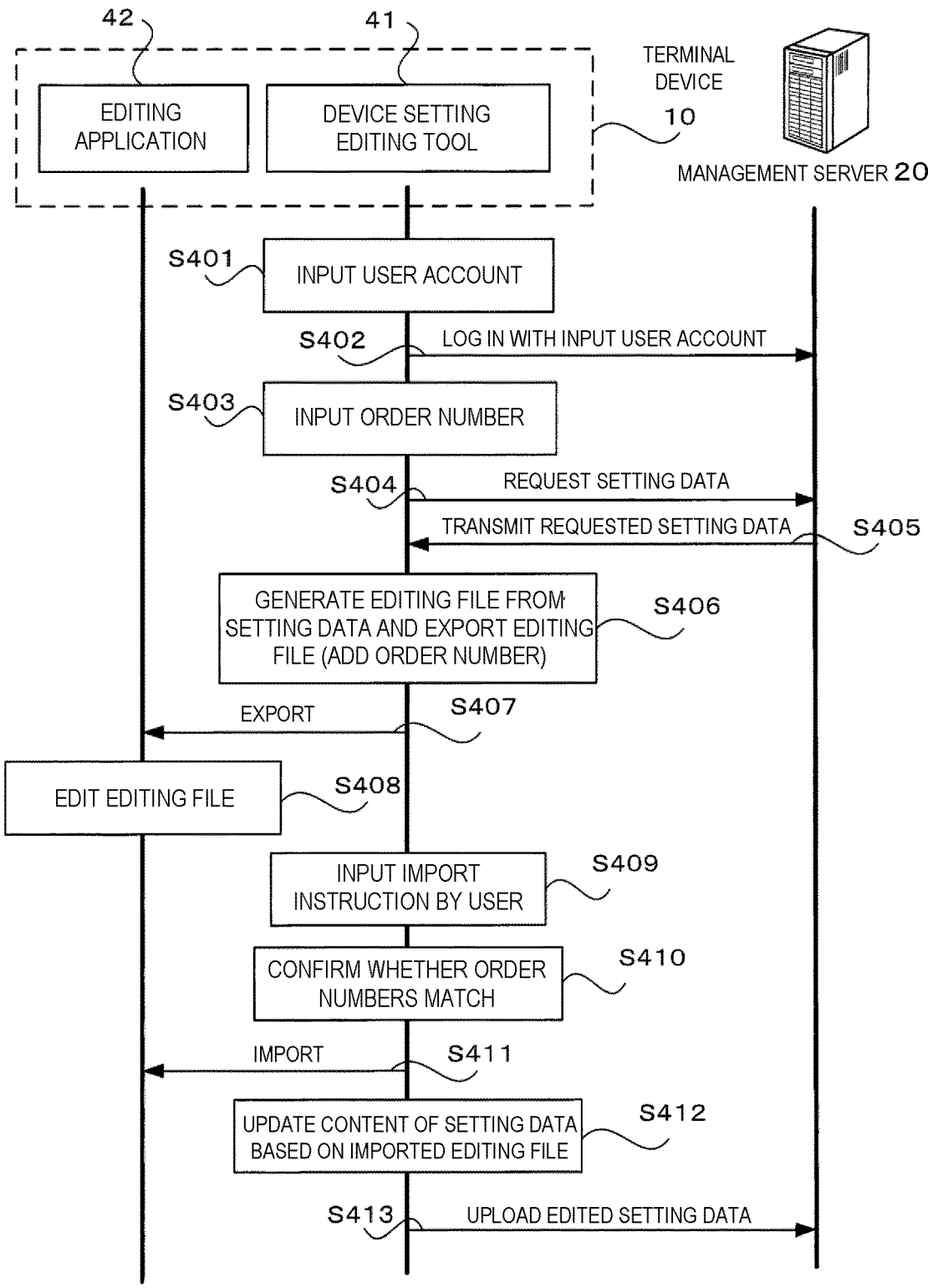
FIG. 22 is a sequence chart illustrating a state of data transmission/reception between the terminal device 10 and the management server 20 in the process of editing the setting data stored in the management server 20.

Next, a sequence chart of FIG. 22 represents a state of data transmission/reception between the terminal device 10 and the management server 20 in the process of editing the setting data stored in the management server 20 described above.

First, in step S401, when the user inputs a user account to the device setting editing tool 41, the device setting editing tool 41 logs in to the setting management service of the management server 20 with the input user account in step S402.

Next, in step S403, when the user inputs an order number to the device setting editing tool 41, the device setting editing tool 41 requests the management server 20 for setting data based on the input order number in step S404.

Then, in step S405, the management server 20 transmits the requested setting data to the device setting editing tool 41.

Next, in the device setting editing tool 41, by designating the data to be edited by the user in step S406, the data designated from the setting data is generated as an editing file, and the editing file generated in step S407 is exported. At this time, the order number is added to the editing file to be exported.

Then, in step S408, the editing application 42 edits the exported editing file based on the user operation.

Next, in the device setting editing tool 41, the import instruction by the user is input in step S409. Then, in step S410, the device setting editing tool 41 confirms whether the order number added to the editing file to be imported matches the order number input by the user at the time of login.

Here, when the two compared order numbers match, the device setting editing tool 41 executes the import process of the editing file in step S411, and updates the content of the setting data with the imported editing file in step S412.

Finally, the device setting editing tool 41 uploads the edited setting data to the management server 20 in step S413.

In the exemplary embodiments above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

Modifications

In the above exemplary embodiment, descriptions have been made on the case in which the setting data for controlling the operation of the image forming apparatus 40 is stored in the management server 20 for editing or set in another image forming apparatus 40. This should be understood as illustrative and should not be construed to be limiting in any sense. The present disclosure is applicable to a case in which setting data for controlling apparatuses (devices) other than an image forming apparatus is handled.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
receive first identification information input from a user along with an instruction to update content of setting information using editing data;
acquire, from an external server device, the setting information corresponding to the first identification information from among plural pieces of setting information for controlling an operation of a device, the plural pieces of setting information being stored in the external server device;
add the first identification information to the acquired setting information to generate editing data;
after the editing data is edited by the user and before importing the edited editing data, determine whether or not (i) the first identification information input from the user when receiving the instruction to update content of the setting information using the editing data and (ii) the first identification information added to the acquired setting information to generate the editing data that is edited by the user match; and
upon determining that (i) and (ii) match, import the edited editing data and update the content of the setting information stored in the external server device based on the edited editing data.

2. The information processing apparatus according to claim 1, wherein
the processor is configured to:
upon determining that (i) and (ii) do not match, not update the content of the setting information stored in the external server device based on the edited editing data.

3. The information processing apparatus according to claim 2, wherein
the processor is configured to:
receive an input of first authentication information in generating the editing data from the acquired setting information;
add the received first authentication information to the editing data;
after the editing data is edited by the user and before importing the edited editing data, request the user to input second authentication information; and
upon determining that (i) the input second authentication information and (ii) the first authentication information added to the edited editing data match, update the content of the setting information stored in the external server device based on the edited editing data.

4. The information processing apparatus according to claim 3, wherein
the processor is configured to:
upon determining that (i) the input second authentication information and (ii) the first authentication information added to the edited editing data do not match, not update the content of the setting information stored in the external server device based on the edited editing data.

5. The information processing apparatus according to claim 1, wherein
the processor is configured to:
receive an input of first authentication information in generating the editing data from the acquired setting information,
add the received first authentication information to the editing data, and
after the editing data is edited by the user and before importing the edited editing data, request the user to input second authentication information; and
upon determining that (i) the input second authentication information and (ii) the first authentication information added to the edited editing data match, update the content of the setting information stored in the external server device based on the edited editing data.

6. The information processing apparatus according to claim 5, wherein
the processor is configured to:
upon determining that (i) the input second authentication information and (ii) the first authentication information added to the edited editing data do not match, not update the content of the setting information stored in the external server device based on the edited editing data.

7. The information processing apparatus according to claim 1, wherein
the processor is configured to:
generate the editing data such that when the user edits the editing data, the user is permitted to view the first identification information added to the editing data but is not permitted to edit the first identification information added to the editing data.

8. A non-transitory computer readable medium storing a program that causes a computer to execute information processing, the information processing comprising:
receiving first identification information input from a user along with an instruction to update content of setting information using editing data;
acquiring, from an external server device, the setting information corresponding to the first identification information from among plural pieces of setting information for controlling an operation of a device, the plural pieces of setting information being stored in the external server device;
adding the first identification information to the acquired setting information to generate editing data;
after the editing data is edited by the user and before importing the edited editing data, determining whether or not (i) the first identification information input from the user when receiving the instruction to update content of the setting information using the editing data and (ii) the first identification information added to the acquired setting information to generate the editing data that is edited by the user match; and
upon determining that (i) and (ii) match, importing the edited editing data and updating the content of the setting information stored in the external server device based on the edited editing data.

9. An information processing apparatus comprising:
receiving means for receiving first identification information input from a user along with an instruction to update content of setting information using editing data;
acquiring means for acquiring, from an external server device, the setting information corresponding to the first identification information from among plural pieces of setting information for controlling an operation of a device, the plural pieces of setting information being stored in the external server device;
adding means for adding the first identification information to the acquired setting information to generate editing data;
determining means for determining, after the editing data is edited by the user and before importing the edited editing data, whether or not (i) the first identification information input from the user when receiving the instruction to update content of the setting information using the editing data and (ii) the first identification information added to the acquired setting information to generate the editing data that is edited by the user match; and
updating means for, upon determining that (i) and (ii) match, importing the edited editing data and updating the content of the setting information stored in the external server device based on the edited editing data.

* * * * *